(12) United States Patent
Poma

(10) Patent No.: US 9,896,063 B2
(45) Date of Patent: Feb. 20, 2018

(54) REMOTE VEHICLE ACCESS SYSTEMS FOR FLEET VEHICLES

(71) Applicant: Huf North America Automotive Parts Manufacturing Corp., Milwaukee, WI (US)

(72) Inventor: Leonardo Poma, Plymouth, MI (US)

(73) Assignee: Huf North America Automotive Parts Manufacturing Corp., Milwaukee, WI (US)

( * ) Notice: Subject to any disclaimer, the term of this patent is extended or adjusted under 35 U.S.C. 154(b) by 0 days.

(21) Appl. No.: 15/039,141

(22) PCT Filed: Dec. 2, 2014

(86) PCT No.: PCT/US2014/068175
§ 371 (c)(1),
(2) Date: May 25, 2016

(87) PCT Pub. No.: WO2015/084856
PCT Pub. Date: Jun. 11, 2015

(65) Prior Publication Data
US 2017/0166163 A1    Jun. 15, 2017

Related U.S. Application Data

(60) Provisional application No. 61/911,221, filed on Dec. 3, 2013.

(51) Int. Cl.
*B60R 25/24* (2013.01)
*G06Q 30/06* (2012.01)
(Continued)

(52) U.S. Cl.
CPC ............ *B60R 25/24* (2013.01); *B60R 25/045* (2013.01); *G06Q 30/0645* (2013.01);
(Continued)

(58) Field of Classification Search
CPC ..... B60R 25/24; B60R 25/00; B60R 25/2081; B60R 25/045; B60R 2325/205;
(Continued)

(56) References Cited

U.S. PATENT DOCUMENTS

| 6,853,853 | B1 * | 2/2005 | Van Wiemeersch .... B60R 25/04 340/5.2 |
| 2006/0173587 | A1 * | 8/2006 | Oesterling .............. B60R 25/00 701/2 |

(Continued)

FOREIGN PATENT DOCUMENTS

| CN | 1392504 A | 1/2003 |
| CN | 201566589 U | 9/2010 |

(Continued)

OTHER PUBLICATIONS

International Searching Authority, International Search Report and Written Opinion for PCT Application No. PCT/US2014/068175, dated Mar. 16, 2015.

(Continued)

*Primary Examiner* — Ali Neyzari
(74) *Attorney, Agent, or Firm* — Honigman Miller Schwartz and Cohn LLP; Brandon C. Griffith; Jonathan P. O'Brien

(57) ABSTRACT

The present disclosure provides a wireless communications system for a fleet of automotive vehicle comprising: a server in communication with a wireless wide area network and including a database; a fob including a memory storing a unique fob identifier, the fob in communication with a wireless local area network; and a control unit in the automotive vehicle including a memory storing a vehicle identifier. The control unit is in communication with the server via the wireless wide area network and with the fob via the wireless local area network, wherein the server stores data correlating the fob identifier to the vehicle identifier in the database, and when the fob transmits a communication to the vehicle through the local area network the vehicle accesses the database to validate the key fob.

21 Claims, 2 Drawing Sheets

(51) Int. Cl.
*G07C 9/00* (2006.01)
*B60R 25/045* (2013.01)

(52) U.S. Cl.
CPC ..... *G07C 9/00309* (2013.01); *G07C 9/00571* (2013.01); *B60R 2325/205* (2013.01)

(58) Field of Classification Search
CPC ........ H04W 4/12; H04W 4/046; H04B 1/034; G07C 9/00571; G06Q 30/0645
USPC ....................................................... 340/4.61
See application file for complete search history.

(56) References Cited

U.S. PATENT DOCUMENTS

2007/0093215 A1* 4/2007 Mervine ............... G08G 1/205 455/99
2011/0060480 A1* 3/2011 Mottla .................. G06Q 10/02 701/2
2012/0071140 A1* 3/2012 Oesterling ............. H04W 4/12 455/414.1
2012/0262272 A1 10/2012 Donlan et al.
2013/0082820 A1 4/2013 Tieman
2013/0293349 A1 11/2013 Templ et al.

FOREIGN PATENT DOCUMENTS

DE 19520472 A1 12/1996
WO WO-2008044091 A1 4/2008

OTHER PUBLICATIONS

State Intellectual Property Office, Notification of First Office Action and Search Report for CN Application No. 201480066012.2, dated Jun. 20, 2017.

* cited by examiner

REMOTE VEHICLE ACCESS SYSTEMS FOR FLEET VEHICLES

CROSS-REFERENCE TO RELATED APPLICATIONS

This application is the national phase of International Application No. PCT/US2014/068175, filed Dec. 2, 2014, which claims the benefit of U.S. Provisional Patent Application No. 61/911,221 filed Dec. 3, 2013, which is hereby incorporated by reference in its entirety.

BACKGROUND OF THE INVENTION

In recent years, wireless communications have become increasingly important in a number of vehicle control systems. Remote vehicle entry transmitters/receivers, for example, are used for locking and unlocking a vehicle door, unlatching a trunk latch, or activating or deactivating an alarm system equipped on the vehicle. This remote entry device is commonly referred to a remote keyless entry (RKE) fob. The RKE fob is typically a small rectangular or oval plastic housing with a plurality of depressible buttons for activating each one of the wireless operations. The RKE fob is carried with the operator of a vehicle and can wirelessly perform these functions when within a predetermined reception range of the vehicle. The RKE fob communicates with an electronic control module within the vehicle via a RF communication signal.

Even more recently, complex embedded electronic systems have become common to provide access and start functions, and to provide wide ranging functions to improve driver safety and convenience. These systems include Passive Entry Passive Start (PEPS) systems. In PEPS systems, a remote receiver and transmitter (or transceiver) is carried with the user in a portable communication device such as a key fob or a card. The portable communication device when successfully challenged transmits a radio frequency (RF) signal to a module within the vehicle for performing a variety of remote vehicle function such door lock/unlock, enabling engine start, or activating external/internal lighting. Passive entry systems include a transmitter and receiver (or transceiver) in an electronic control module disposed within the vehicle. The transceiver is typically in communication with one or more devices (e.g., door lock mechanism) for determining when a request for actuation of a device is initiated (e.g., lifting a door handle) by a user.

Upon sensing the request for actuation, the transceiver broadcasts a passive entry interrogating signal. The fob upon receiving the interrogating signal from the ECU, the portable communication device determines if the interrogating signal is valid. If it is determined a valid signal, then the fob automatically broadcasts an output signal which includes an encrypted or rolling identification code to the electronic control module. The electronic module thereafter determines the validity of the output signal and generates a signal to the device to perform an operation (e.g., the door lock mechanism to unlock the door) if the output signal is determined valid.

Key fobs and other personal ID devices are typically issued with a vehicle, and are pre-programmed for a target vehicle. Due to memory restrictions in both the vehicle and the fob, a limited number of fobs can be assigned to a single vehicle. Similarly, in applications requiring a single fob to operate a number of vehicles, special hardware is often required. The present disclosure addresses methods for assigning multiple fobs to a single vehicle, and multiple vehicles to a single fob without the need for additional hardware.

SUMMARY OF THE INVENTION

In one aspect, the present disclosure provides a wireless communications system for a fleet of automotive vehicle comprising: a server in communication with a wireless wide area network and including a database; a fob including a memory storing a unique fob identifier, the fob in communication with a wireless local area network; and a control unit in the automotive vehicle including a memory storing a vehicle identifier. The control unit is in communication with the server via the wireless wide area network and with the fob via the wireless local area network, wherein the server stores data correlating the fob identifier to the vehicle identifier in the database, and when the fob transmits a communication to the vehicle through the local area network the vehicle accesses the database to validate the key fob.

In another aspect, the present disclosure provides a method for correlating vehicles and fobs. At least one vehicle identifier and one fob identifier are stored in a database external to each of the fob and the vehicle. The database selectively identifies paired vehicle identifiers and fob identifiers. When a fob is activated within a predetermined distance of a vehicle, the database is queried to determine whether the fob is paired to the vehicle. Access to the vehicle is allowed when the database verifies that the fob is paired with the vehicle.

These and other aspects of the invention will become apparent from the following description. In the description, reference is made to the accompanying drawings which form a part hereof, and in which there is shown a preferred embodiment of the invention. Such embodiment does not necessarily represent the full scope of the invention and reference is made therefore, to the claims herein for interpreting the scope of the invention.

DETAILED DESCRIPTION OF THE INVENTION

Figure 1:
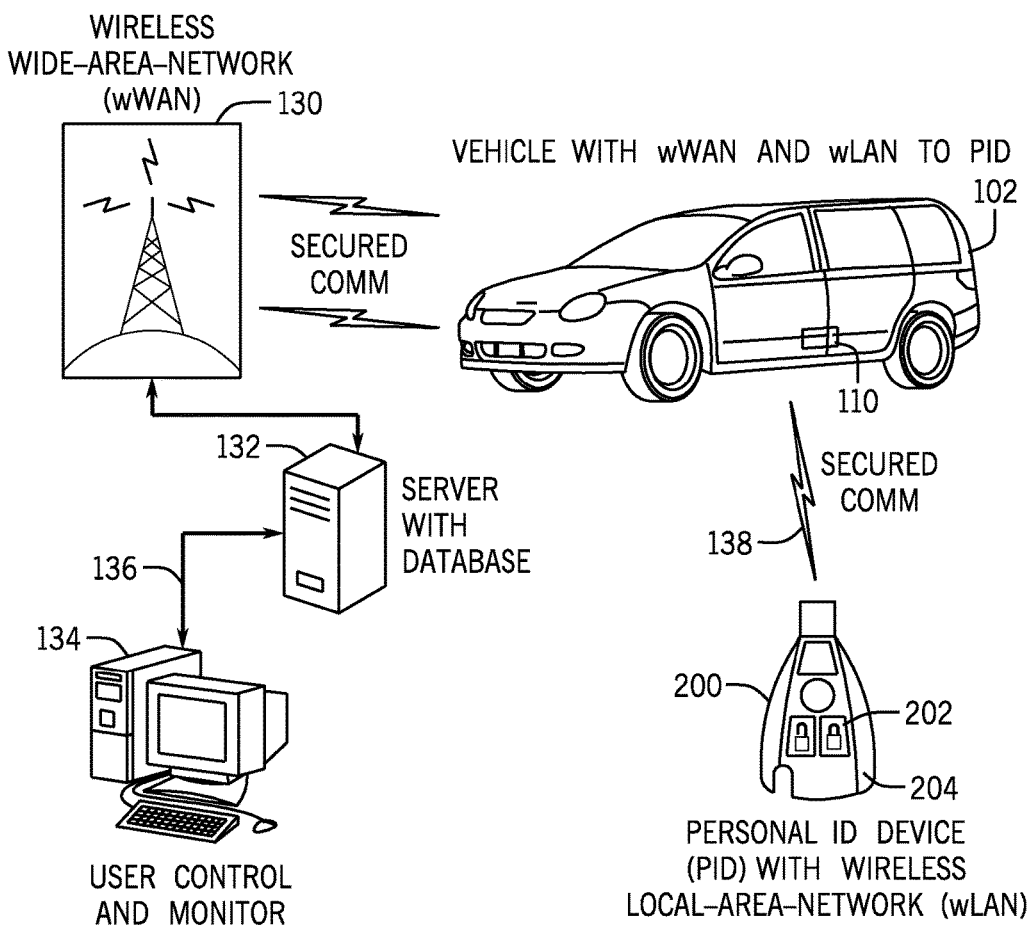
FIG. 1 is a system overview of a wireless communications system for a fleet of automotive vehicles.

Referring to FIG. 1, a wireless vehicle communication system 100 is shown. The system 100 comprises a vehicle 102 including a vehicle transceiver module 110 communicating with a mobile electronic user device 200, which here is shown and described as a key fob. It will be apparent that the mobile electronic user device 200 can be many types of application-specific or personal computerized devices, including, for examples, transponder cards, personal digital assistants, tablets, cellular phones, and smart phones. Although transceiver modules are described, it will be apparent that communications between the vehicle and a key fob or other external device can be bi-directional or uni-directional, and that receivers and transmitters can be use individually depending on the application.

Referring still to FIG. 1, the vehicle 102 is in communication with server 132 through a wireless wide area network (wWAN) 130 or server network which can be provided through a satellite, cellular telephone, or other wireless communications system. A user control 134 which can be, as shown here, a computer with corresponding monitor and user input device such as a mouse, keyboard, or other device known to those of skill in the art, is in bi-directional communications with the server 132 through a secured network 136, allowing access to an internal database (FIG. 5) correlating one or more key fob 200 to one or more vehicle 102. The vehicle 102 is in further communication with the fob 200 through a wireless local area or fob network (wLAN) 138. The user control 134 also includes a wireless local area network which can enable communication with key fobs 200 for validation purposes.

The key fob 200 can include one or more user input device 202 and one or more user output or alert devices 204. The user input devices 202 are typically switches such as buttons that are depressed by the user. The user output alert devices 204 can be one or more visual alert, such as light emitting diodes (LEDs), a liquid crystal display (LCD), and audible alarm, or a tactile or vibratory device. A single function can be assigned to each input device 202 or user alert devices 204, or a combination of input devices or a display menu could be used to request a plethora of functions via input device sequences or combinations. Key fobs can, for example, provide commands to start the vehicle, provide passive entry (i.e., automatic unlocking of the doors of the vehicle 102 when key fob 200 is within a predetermined proximate distance of the vehicle 102), activate external and internal vehicle lighting, preparation of the vehicle locking system, activation of a vehicle camera for vehicle action in response to camera-detected events, opening windows, activating internal electric devices, such as radios, telephones, and other devices, and adjustment of driver preferences (e.g., the position of the driver's seat and the tilt of the steering wheel) in response to recognition of the key fob 200. These functions can be activated input devices 202 or automatically by the vehicle 102 detecting the key fob 200. Although a single key fob is shown here, it will be apparent that any number of key fobs could be in communication with the vehicle transceiver module, and the vehicle transceiver module 110 and corresponding control system could associate a different set of parameters with each key fob.

In addition, the vehicle transceiver module 110 can activate output or alert devices 204 to notify the vehicle user that the key fob 200 is within communication distance or some other predetermined distance of the vehicle 102; notify the vehicle user that a vehicle event has occurred (e.g., activation of the vehicle security system), confirm that an instruction has been received from the key fobs 200, or that an action initiated by key fob 200 has been completed.

Figure 2:
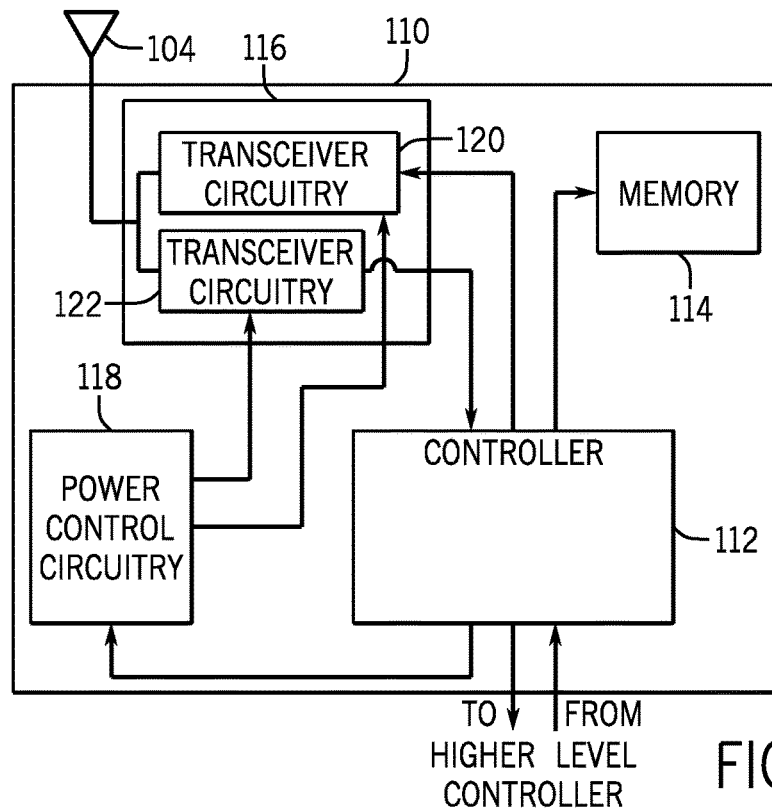
FIG. 2 is a block diagram of an exemplary vehicle transceiver module that can be used in the disclosed system.

Referring now to FIG. 2, a block diagram of an exemplary vehicle transceiver module 110 that can be used in accordance with the disclosed system is illustrated. The vehicle transceiver module 110 includes a processor or controller 112, memory 114, a power supply 118, and transceiver circuitry 116 communicating through the antenna 104.

The transceiver circuitry 116 includes transceiver circuitry 122 which can be in bi-directional communications with the wireless wide area network 130, and transceiver circuitry 120 configured for bi-directional communications with the wireless local area network 138. In alternative embodiments, communications with the wWAN can be provided through another communications device, such as the OnStar module that is available in vehicles produced by the General Motors Corporation of Detroit, Mich. Other competitive products will be known to those of ordinary skill in the art.

The memory 114 stores a unique identifier identifying the vehicle 102, as well as data and operational information for use by the processor 112 to perform the functions of the vehicle transceiver module 110, and to provide the vehicle function(s) described above. The memory 114 can also temporarily store unique identifiers corresponding with key fobs 200 that have been validated to the vehicle 102. This data can be temporarily overwritten by the server 132 as desired to change the pairing of key fobs 200 and vehicle 102.

The controller 112 is also coupled to a higher level vehicle controller or controllers (not shown), which can include, for example, a vehicle bus such as a Controller Area Network (CAN) bus system and corresponding vehicle control system, and can both receive command signals from the vehicle control system and provide command signals and other information to the vehicle control system. Information available to other devices from the CAN bus or other online vehicle bus may include, for example, vehicle status information regarding vehicle systems, such as ignition status, odometer status (distance traveled reading), wheel rotation data (e.g., extent of wheel rotation), etc. Vehicle status data can also include status of electronic control systems including among others, Supplemental Restraint Systems (SRS), Antilock Braking Systems (ABS), Traction Control Systems (TCS), Global Positioning Systems (GPS), Environmental monitoring and control Systems, Engine Control Systems, cellular, Personal Communications System (PCS), and satellite based communication systems and many others not specifically mentioned here.

The transceiver 110 is coupled to the antenna 104 for receiving radio frequency (RF) signals from the key fob 200 and transmitting signals to the key fob 200 through wLAN 138. Although the antenna 104 is shown as being external to the vehicle transceiver module 110 and on the exterior of the vehicle 102, the antenna 104 may also be implemented within the confines of the vehicle 120 or even within the vehicle. A number of antennas can be embedded, for example, in the door handles of a vehicle, or elsewhere within a vehicle. Although a bi-directional transceiver 110 is shown, it will be apparent that one way communications from the key fob 200 to the vehicle 102, or from the vehicle to the key fob 200 can also be provided, and that both a transmitter and receiver would not be required. For communications though the wireless LAN 138, protocols such as wifi, wiMax, and other wireless protocols can be used.

Figure 3:
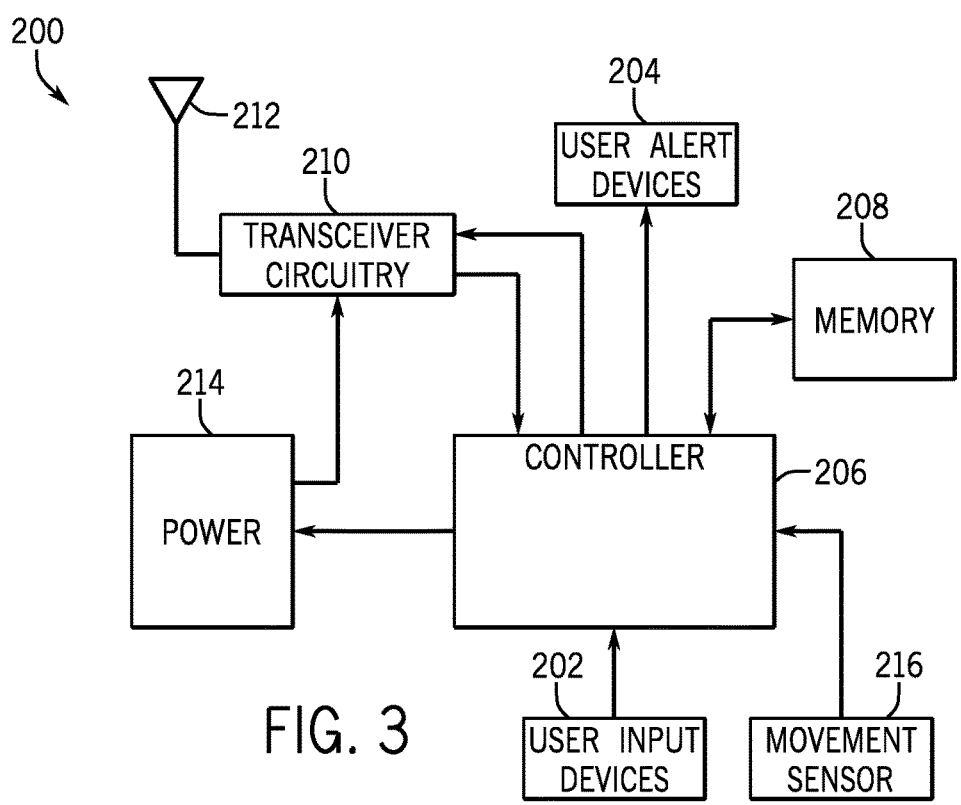
FIG. 3 is a block diagram of an exemplary key fob that can be used in accordance with the disclosed system

Referring now to FIG. 3, a block diagram of an exemplary key fob 200 that can be used in accordance with the disclosed system includes a controller 206, memory 208, transceiver 210 and corresponding antenna 212, and a power supply 214 (such as a battery). User input devices 202 and user alert devices 204 are in communication with the controller 206. The transceiver circuitry 210 includes receiver circuitry and transmitter circuitry, the receiver circuitry demodulating and decoding received RF signals transmitted using a wifi, wiMax, or other wireless protocol, as described above, to derive information and to provide the information to the controller or processor 206 to provide functions requested from the key fob 200. The transmitter circuitry encodes and modulates information from the processor 206 into RF signals for transmission via the antenna 212 to the vehicle transceiver 110 with the protocols discussed above. The memory 208 stores a unique identifier identifying the key fob 200.

Although many different types of communications systems could be used, conventional vehicles typically utilize four short-range RF based peer-to-peer wireless systems, including Remote Keyless Entry (RKE), Passive Keyless Entry (PKE), Immobilizer and Tire Pressure Monitoring System (TPMS). RKE and TPMS typically use the same high frequency with different signal modulation (315 MHz for US/NA, 433.32 MHz for Japan and 868 MHz for Europe), whereas the PKE system often requires a bidirectional communication at a low frequency (125 KHz) between the key fob and the receiver module and a unidirectional high frequency communication from key fob to the receiver module. The Immobilizer system also typically uses a low frequency bidirectional communication between the key fob and the receiver module. Receivers for these systems are often standalone and/or reside in various control modules like Body Control Module (BCM) or Smart Junction Block (SJB). By using different radios with different carrier frequencies and/or modulation schemes, collisions between transmissions from separate wireless communication systems in the vehicles can be avoided.

The antenna 212 located within the fob 200 may be configured to transmit long-range ultra-high frequency (UHF) signals to the antenna 104 of the vehicle 100 and receive short-range Low Frequency (LF) signals from the antenna 104. However, separate antennas may also be included within the fob 200 to transmit the UHF signal and receive the LF signal. In addition, antenna 104 and other antennas in the vehicle may be configured to transmit LF signals to the fob 200 and receive UHF signals from the antenna 212 of the fob 200. Also, separate antennas may be included within the vehicle 102 to transmit LF signals to the fob 200 and receive the UHF signal from the fob 200.

The fob 200 may also be configured so that the fob controller 206 may be capable of switching between one or more UHF channels. As such, the fob controller 206 may be capable of transmitting a response signal across multiple UHF channels. By transmitting the response signal across multiple UHF channels, the fob controller 206 may ensure accurate communication between the fob 200 and the vehicle transceiver 110.

Referring still to FIG. 3, a motion detection device, such as a movement sensor 216, can optionally be included in the key fob 200 to detect movement of the key fob 200. The controller 206 can, for example, utilize the motion or lack of motion detected signal from the movement sensor 216 to place the key fob 200 in a sleep mode when no motion is detected for a predetermined time period. The predetermined time period during which no motion is detected that could trigger the sleep mode could be a predetermined period of time or a software configurable value. Although the motion detection device is here shown as part of the key fob, a motion detection device could additionally or alternatively be provided in the vehicle 102.

The vehicle transceiver 110 may transmit one or more signals without an operator activating a switch or pushbutton on the fob 200, including a wakeup signal intended to activate a corresponding fob 200. The fob 200 may receive signals from the transceiver 110 and determine the strength or intensity of the signals (Received Signal Strength Indication (RSSI)), which can be used to determine a location of the fob 200.

Referring again to FIG. 1, in operation, data identifying key fobs 200 and vehicles 102 can be entered into user control 134 through a secure location at, for example, a manufacturer or fleet management office. The user control 134 can also read identifiers from key fobs 102 through a wireless LAN in communication with the control 134 to enter the key fob identifiers into the system. Key fobs 200 can then be paired with vehicles 102, and the data transmitted through secure network 136 and stored in a database in the server 132.

Referring still to FIG. 1, the server 132 stores a database correlating unique identifiers of vehicles 102 to unique identifiers of key fobs 200. Any number of vehicles 102 can be correlated with a selected key fob 200, and any number of key fobs 200 can be correlated to selected vehicles 102. A single key fob 200, therefore, can be paired to control one vehicle 102 or a plurality of vehicles 102. Each vehicle 102 can be correlated to a single key fob 200, or a plurality of key fobs 200.

In operation, when a key fob 200 is activated adjacent a vehicle 102, communications are transmitted through the wireless LAN 138. The vehicle 102 first verifies whether the key fob 200 requesting access is identified in internal memory 114. If not, the vehicle 102 can request information from server 132 to determine whether the key fob 200 is paired to the vehicle 102. As described above, databases can be stored in server 132 correlating any number of vehicles 102 to any number of key fobs 200, and changed as needed by the user, thereby significantly simplifying and reducing the cost of fleet management and other large scale vehicle management systems, and similarly simplifying the ability of a group of drivers to use a single vehicle by enabling validating of a large number of key fobs 200 for controlling a single vehicle 102.

Although specific embodiments are described above, it will be apparent to those of ordinary skill that a number of variations can be made within the scope of the disclosure. The present invention can be used for various types of vehicles including automobiles, trucks, buses and other types of cargo and transport vehicles. Further, while various communication systems are described above, it will be apparent specific types of network, radio frequency, cellular or other communications can be replaced with other types of systems without varying the scope of the invention. Furthermore, various types of processor devices, memory components, and display elements can be used. Additionally, although a specific key fob is described above, it will be apparent that a fob can be provided as part of a personal communication device such as a cellular phone, tablet, laptop, or other device enabled to communicate with the vehicle. Further, although a server is described, it will be apparent that various types of computing devices can provide the function described. It should be understood, therefore, that the methods and apparatuses described above are only exemplary and do not limit the scope of the invention, and that various modifications could be made by those skilled in the art that would fall within the scope of the invention. To apprise the public of the scope of this invention, the following claims are made:

I claim:

1. A wireless communications system for a fleet of automotive vehicles comprising:
   a server in communication with a server network and including a database;
   a fob including a fob memory storing a unique fob identifier, the fob in communication with a fob network; and
   a control unit in an automotive vehicle including a vehicle memory storing a vehicle identifier, the control unit in communication with the server via the server network and with the fob via the fob network, wherein the server stores data correlating the fob identifier to the vehicle identifier in the database, and when the fob transmits a communication to the automotive vehicle through the fob network the automotive vehicle accesses the database to validate the fob.

2. The wireless communications system of claim 1, wherein the server network is a wireless wide area network.

3. The wireless communications system of claim 1, wherein the fob network is a wireless local area network.

4. The wireless communications system of claim 1, further comprising a plurality of fobs and wherein the server correlates each of the plurality of fobs with the automotive vehicle.

5. The wireless communications system of claim 1, further comprising a plurality of automotive vehicles, and wherein the server correlates each of the plurality of automotive vehicles with the fob.

6. The wireless communications system of claim 1, wherein the fob comprises a personal communications device.

7. The wireless communications system of claim 1, wherein the automotive vehicle comprises at least one of a bus and a truck.

8. The wireless communication system of claim 1, further comprising a user control in communication with the server, and wherein the user control is programmed to enter vehicle identifier data into the database.

9. The wireless communication system of claim 1, further comprising a user control in communication with the server, and wherein the user control is programmed to enter fob identifier data into the database.

10. A method for correlating one or more vehicle with one or more key fob, the method comprising the following steps:
storing at least one vehicle identifier and at least one fob identifier in a database external to each of the fob and the vehicle, the database selectively identifying paired vehicle identifiers and fob identifiers;
detecting a fob activated within a predetermined distance of the vehicle;
querying the database to determine whether the fob is paired to the vehicle; and
allowing the fob to access functions in the vehicle if the database verifies that the fob is paired with the vehicle.

11. The method of claim 10, further comprising the step of selectively adding the at least one vehicle identifier to the database and selectively correlating the at least one vehicle identifier to one or more of the at least one fob identifier.

12. The method of claim 10, further comprising the step of selectively adding at least one fob identifier to the database and selectively correlating the fob identifier to one or more vehicle identifier.

13. The method of claim 10, further comprising the step of querying an internal vehicle memory to determine whether the fob identifier is stored in internal memory before querying the database.

14. The method of claim 10, wherein the step of querying the database comprises communicating to the database from a controller in the vehicle through a wireless wide area network.

15. The method of claim 10, wherein the step of detecting a fob comprises detecting a communication from the fob at the vehicle through a local area network.

16. The method of claim 10, further comprising the steps of communicatively coupling a user control to the database, and using the user control selectively adding the at least one vehicle identifier and the at least one fob identifier to the database.

17. The method of claim 10, further comprising the step of scanning the fob to obtain the fob identifier at the user control.

18. The method of claim 17, further comprising the step of enabling the vehicle to communicate with the fob through a first network and with the database through a second network.

19. The method of claim 17, wherein the fob comprises a personal communications device.

20. The method of claim 17, further comprising the step of preventing the fob from accessing vehicle functions if the database determines that the fob is not paired with the vehicle.

21. The wireless communication system of claim 1, wherein the control unit is configured to query the vehicle memory to determine whether the fob identifier is stored in the vehicle memory before the vehicle accesses the database to validate the key fob.

* * * * *